United States Patent [19]

Gorewitz

[11] 4,265,049
[45] May 5, 1981

[54] TEMPORARY PLANT COVERS

[76] Inventor: Lynda Gorewitz, 9107 Shad La., Potomac, Md. 20854

[21] Appl. No.: 948,137

[22] Filed: Oct. 3, 1978

[51] Int. Cl.³ .............................................. A01G 13/00
[52] U.S. Cl. ..................................... 47/26; 47/28 R; 47/29; 47/69
[58] Field of Search ....................... 47/1, 2, 17, 19, 20, 47/21, 22, 26, 27, 28, 29, 30, 31, 69, 84

[56] References Cited

U.S. PATENT DOCUMENTS

| | | | |
|---|---|---|---|
| 1,446,416 | 2/1923 | Curtiss | 47/21 |
| 1,820,040 | 8/1931 | Zuckerman | 47/22 |
| 3,270,461 | 9/1966 | Fowler | 47/21 X |
| 3,325,951 | 6/1967 | Johnson | 47/29 X |
| 3,681,872 | 8/1972 | Leitch | 47/1 |
| 4,034,508 | 7/1977 | Dedolph | 47/84 |

FOREIGN PATENT DOCUMENTS 759890  6/1971  Belgium .................................. 206/423

*Primary Examiner*—Edgar S. Burr
*Assistant Examiner*—James R. Feyrer
*Attorney, Agent, or Firm*—Leitner, Palan, Martin & Bernstein

[57] ABSTRACT

A reusable temporary cover for indoor house plants to retain moisture for the plant. The cover is formed of flexible transparent plastic sheet material with tie means to completely enclose a house plant and includes a water retention portion to catch and store excess water. By enclosing the plants after watering, a terrarium effect is produced and moisture is retained within the cover for a long period of time.

2 Claims, 6 Drawing Figures

U.S. Patent May 5, 1981 4,265,049
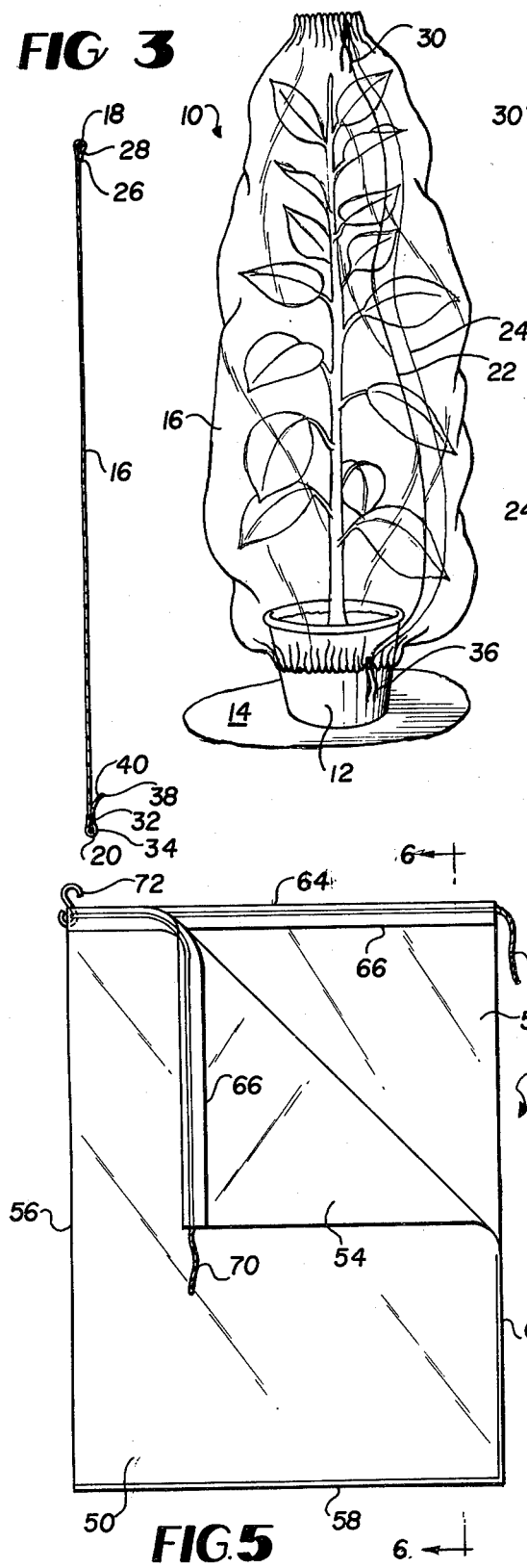
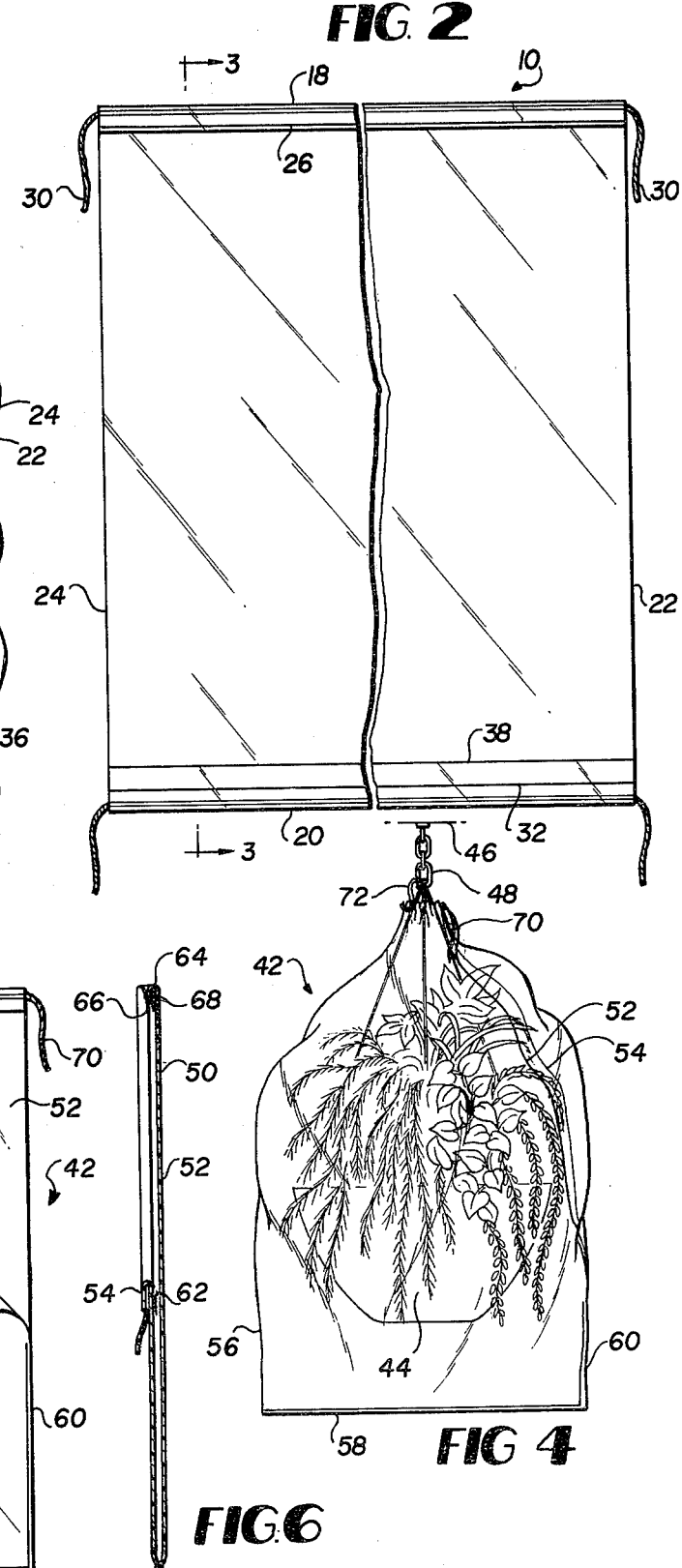

TEMPORARY PLANT COVERS

BACKGROUND OF THE INVENTION

This invention relates to covers for indoor house plants that are to be used as a temporary measure when the plants cannot be watered or sprayed for an extended period of time.

Usually, when one wanted to be sure that their indoor house plants would be properly watered and/or sprayed during a period of absence such as a vacation, it was necessary either to transport all of the plants to another house where proper care could be given or a person would be authorized to enter the residence for the purpose of caring for the plants. Neither alternative worked well since in the former situation, the change in environment could seriously affect the plants while in the latter situation, the person employed to care for the plants would not always be diligent in his responsibilities.

There thus exists a need for an inexpensive device that is easy to use and will keep plants watered for a long period of time witout the need for constant care.

OBJECTS OF THE INVENTION

It is an object of the present invention to provide a new and improved cover for indoor house plants.

It is another object of the present invention to provide a new and improved plant cover that can be easily placed about the plants and will permit light to pass through to the plants.

It is yet another object of the present invention to provide a reusable plant cover that will catch and retain any excess water placed on the plants.

It is still yet another object of the present invention to provide a reusable plant cover that can be easily made in different sizes to fit the many types and sizes of house plants and which is relatively easy to manufacture and inexpensive in cost.

SUMMARY OF THE INVENTION

The above outlined objectives as well as other objects and features of the present invention are accomplished by a reusable cover comprising a sheet of flexible material such as polyethylene having tie means to retain the cover about the plant. In one embodiment for use with plants resting on a floor or other surface, the cover includes a pair of the tie means for securing the cover to the plant container as well as tieing the cover to a closed position above the plant. A lip along the inner lower portion of the cover prevents leakage of excess water from the cover. In a second embodiment for use with hanging plants, the cover includes a closed lower portion which encloses the plant container to retain any excess water, an upper tie means to fully enclose the plant and a hook on the upper portion of the cover to assist in supporting the cover.

BRIEF DESCRIPTION OF THE DRAWINGS

For a full understanding of the nature and objects of the invention, reference should be had to the following detailed description taken in conjunction with the accompanying drawings in which:

FIG. 1 is a perspective view of a house plant resting on a horizontal surface and enclosure by a temporary plant cover in accordance with a first embodiment of the present invention;

FIG. 2 is a plan view showing the first embodiment of the present invention;

FIG. 3 is a sectional view taken along the line 3—3 of FIG. 2 looking in the direction of the arrows:

FIG. 4 is a perspective view of a second embodiment of the temporary plant cover of the present invention for use with a hanging plant;

FIG. 5 is a view in partially folded condition of the second embodiment of the temporary plant cover of the present invention; and FIG. 6 is a sectional view taken along the line 6—6 of FIG. 5 looking in the direction of the arrows.

DESCRIPTION OF THE PREFERRED EMBODIMENTS

Referring now to the drawing in detail, where like reference numerals indicate like parts throughout the several figures, reference numeral 10 indicates a first embodiment of the temporary plant cover of the present invention for use with a plant in a container 12 adapted to sit on a horizontal surface 14 such as a floor, shelf, or a table.

The temporary plant cover 10 is preferably made from a heat-sealable plastic sheet material such as polyethylene although other types of flexible sheet material may be used. As will be discussed below, polyethylene is preferred for its heat sealing capability as well as its light transmitting and water impermeable characteristics.

The temporary plant cover 10, as seen best in FIG. 2, comprises a substantially rectangular sheet 16 having an upper edge 18, a lower edge 20 and side edges 22,24. Although sheet 16 is shown rectangular with edges 18,20 being the longer dimension, it should be obvious that other shapes including squares can be utilized depending on the size of the plant to be covered. The upper edge 18 is formed by folding a portion of sheet 16 and heat sealing the folded portion along line 26 which is sufficiently spaced from upper edge 18 to form an opening or channel 28 for an upper tie means such as drawstring 30. The lower edge 20 is formed by folding a portion of sheet 16 and heat sealing the folded portion along line 32 which is sufficiently spaced from lower edge 20 to form an opening or channel 34 for a lower tie means such as drawstring 36. As discussed previously, if polyethylene is used then the openings 28,34 are preferably formed by heat sealing along lines 26,32 respectively, however, if other materials are used then other suitable means such as adhesive or sewing can be utilized, however, as discussed below, it is important that the lower seal line 32 be a continuous seal.

As seen best in FIG. 3, the lower folded portion is formed of a larger portion of sheet 16 then the upper folded portion with seal line 32 being between lower edge 20 and the distal edge 38 of the lower folded portion. The portion between seal line 32 and distal edge 38 forms an open trough 40 to catch and retain excess water and is preferably of greater dimension than the portion between lower edge 20 and seal line 32.

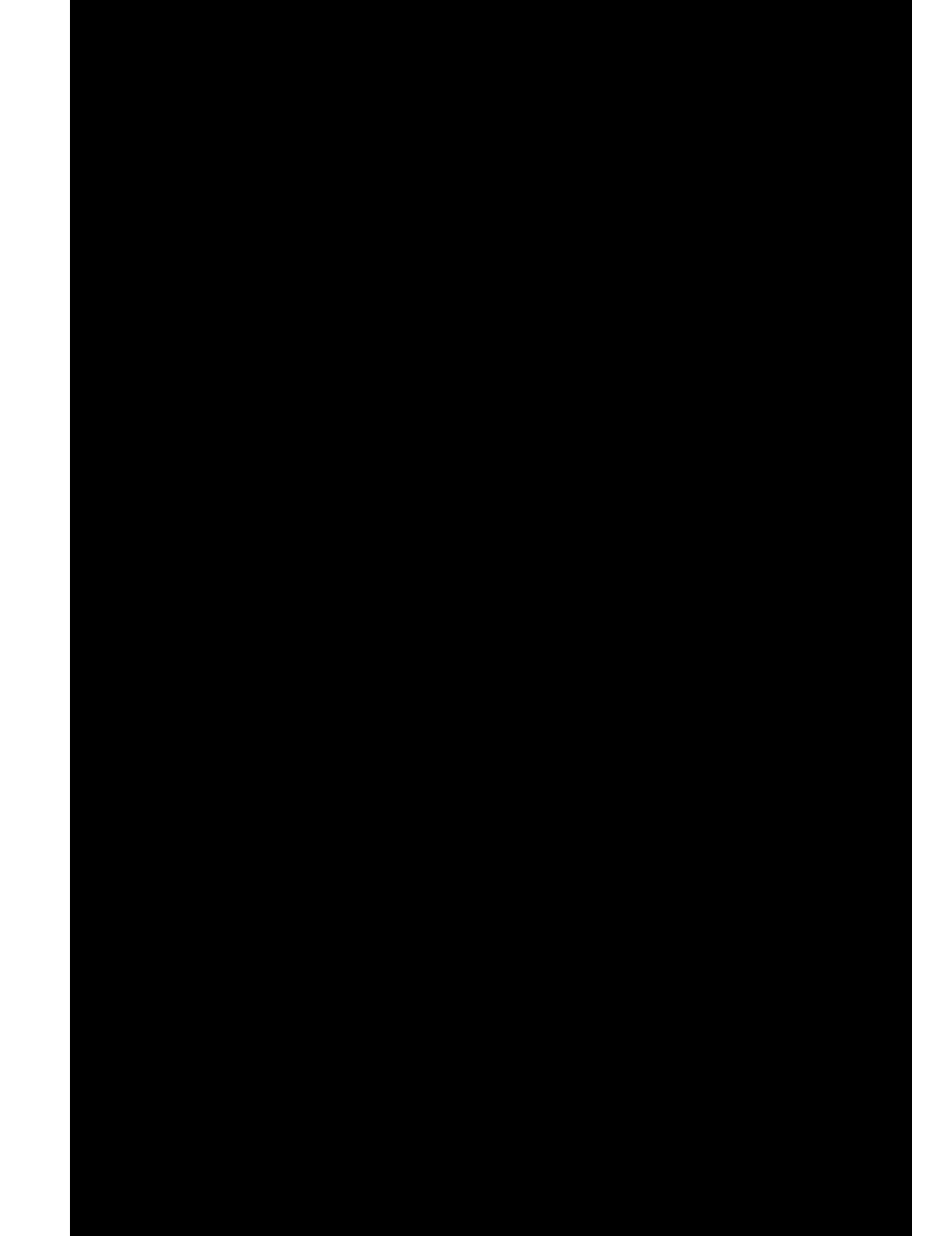

To use the temporary plant cover 10 shown in FIGS. 1, 2 and 3, a user initially places the cover 10 in back of the plant with the surface of the cover as shown in FIG. 2 facing the user so that the trough 40 will be on the inside of the cover when the cover envelopes the plant completely. The user then brings the edges 22,24 about the plant and tightens the bottom edge 20 about the plant container 12 by pulling on drawstring 36. The upper edge 18 is then closed about the upper portion of